(12) United States Patent
Munir et al.

(10) Patent No.: US 8,609,565 B1
(45) Date of Patent: Dec. 17, 2013

(54) LOW-TEMPERATURE PROTONIC CONDUCTION FOR HYDROGEN-RELATED ENERGY APPLICATIONS EMPLOYING NANOSTRUCTURED FUNCTIONAL OXIDES

(75) Inventors: Zuhair A. Munir, Davis, CA (US); Sangtae Kim, Davis, CA (US); Umberto Anselmi-Tamburini, Davis, CA (US); Manfred Martin, Wuerselen (DE)

(73) Assignee: The Regents of the University of California, Oakland, CA (US)

( * ) Notice: Subject to any disclaimer, the term of this patent is extended or adjusted under 35 U.S.C. 154(b) by 1260 days.

(21) Appl. No.: 12/052,671

(22) Filed: Mar. 20, 2008

Related U.S. Application Data

(63) Continuation-in-part of application No. 11/107,321, filed on Apr. 15, 2005, now Pat. No. 7,601,403.

(51) Int. Cl.
    *C04B 35/10* (2006.01)
(52) U.S. Cl.
    USPC ........... 501/152; 501/134; 501/153; 501/154; 977/811; 977/831; 977/832
(58) Field of Classification Search
    USPC .......... 501/134, 152, 153, 154; 977/811, 831, 977/832
    See application file for complete search history.

(56) References Cited

U.S. PATENT DOCUMENTS

| | | | |
|---|---|---|---|
| 5,794,113 | A | 8/1998 | Munir et al. |
| 6,261,420 | B1 | 7/2001 | Kubota et al. |
| 7,601,403 | B2 | 10/2009 | Anselmi-Tamburini et al. |
| 2003/0110707 | A1 * | 6/2003 | Rosenflanz et al. ............ 51/307 |
| 2006/0163066 | A1 * | 7/2006 | Hilchenko et al. ............ 204/450 |

FOREIGN PATENT DOCUMENTS

WO    WO 2004109835    * 12/2004

OTHER PUBLICATIONS

Tadokoro et al. "Synthesis, sintering and impedance spectroscopy of 8 mol% yttria-dopedceria solid electrolyte", Journal of Power Sources, vol. 130, Issues 1-2, 3 May 2004, pp. 15-21.*
Ji et al. "The effect of Pr co-dopant on the performance of solid oxide fuel cells with Sm-doped ceria electrolyte", Journal of Alloys and Compounds 389 (2005) 317-322.*
Anselmi-Tamburini, Umberto et al.; "Enhanced Low-Temperature Protonic Conductivity in Fully Dense Nanometric Cubic Zirconia,"; *Applied Physics Letters*; 2006; pp. 163116-1-163116-3; vol. 89.
Kim, Sangtae et al.; "Unprecedented Room-Temperature Electrical Power Generation Using Nanoscale Fluorite-Structured Oxide Electrolytes," *Advanced Materials*; 2008; pp. 556-559; vo. 20.
Kim, Young-Wook et al; "Effect of Initial Particle Size on Microstructure of Liquid-Phase Sintered α-Silicon Carbide,"; *Journal of European Cermic Society*; 2000; pp. 945-949; vol. 20.
International Search Report mailed on Aug. 8, 2007, for PCT Patent Application No. PCT/US2006/013872, 1 page.
Written Opinion of the International Searching Authority mailed on Aug. 8, 2007, for PCT Patent Application No. PCT/US2006/013872, 4 pages.

* cited by examiner

*Primary Examiner* — Patrick Ryan
*Assistant Examiner* — Ladan Mohaddes
(74) *Attorney, Agent, or Firm* — Kilpatrick Townsend & Stockton LLP

(57) ABSTRACT

The present invention provides a proton conducting thin film having a dense nanometric ceramic material with a relative density of at least about 90% and a grain size of less than about 30 nm, wherein the proton conducting thin film is capable of operating at temperatures of less than about 100° C. in the presence of water vapor. The present invention also provides an electrochemical device using the proton conducting thin film, and a method of making the proton conducting thin film.

5 Claims, 16 Drawing Sheets

Zry3-HP5-2

850°C 530 MPa 5 min

CeOSm-NH3-HP5-1

750°C 530MPa 5 min

CeO2-8L-SPSHP5-3
625°C, 600 MPa, 5 min (a)

(b)

LOW-TEMPERATURE PROTONIC CONDUCTION FOR HYDROGEN-RELATED ENERGY APPLICATIONS EMPLOYING NANOSTRUCTURED FUNCTIONAL OXIDES

CROSS-REFERENCES TO RELATED APPLICATIONS

This application is a continuation-in-part of U.S. application Ser. No. 11/107,321, filed Apr. 15, 2005, and incorporated in its entirety herein.

STATEMENT AS TO RIGHTS TO INVENTIONS MADE UNDER FEDERALLY SPONSORED RESEARCH OR DEVELOPMENT

This invention was made with Government support under Grant No. CTS-0244832, awarded by the National Science Foundation. The Government has certain rights in this invention.

BACKGROUND OF THE INVENTION

In some embodiments, the present invention relates generally to the field of material science and engineering. More particularly, the embodiments of the present invention relate to methods for the preparation of dense bulk nanostructured functional oxide materials having a crystallite size of less than about 30 nm.

Nanocrystalline materials have received a widespread attention in the past few years due to their unique combination of physical, chemical, and mechanical properties (e.g., see, Karch, J., Birringer, R. & Gleiter, H, Ceramics ductile at low temperature. *Nature* 330, 556-558 (1987); McFadden, S. X., Mishra, R. S., Valiev, R. Z., Zhilyaev, A. P. & Mukherjee, A. K. Low-temperature superplasticity in nanostructured nickel and metal alloys. *Nature* 398 684-686 (1999); Gleiter, H. Nanostructured materials: basic concepts and microstructure. *Acta Mater.* 48, 1-29 (2000); Moriarty, P. Nanostructured materials. Rep. Prog. Phys. 64, 297-381 (2001); Schoonman, Nanostructured materials in solid state ionics. *J. Solid State Ionics* 135, 5-19 (2000); Schoonman, Nanoionics. *J. Solid State Ionics* 157, 319-326 (2003); Cain, M. & Morrell, R. Nanostructured ceramics: a review of their potential. *Appl. Organometal. Chem.* 15, 321-330 (2001); Yan, D. S., Qiu, H. B., Zheng, Y. S., Gao, L. Bulk nanostructured oxide materials and the superplastic behavior under tensile fatigue at ambient environment. *Nanostructured Materials* 9, 441-450 (1997); and Mayo, M. J. Processing of nanocrystalline ceramics from ultrafine particles. *International Materials Reviews* 41, 85-115 (1996)).

Although significant accomplishments have been made in the area of the synthesis of nanometric powders and clusters (e.g., see Yitai, Q. Chemical preparation and characterization of nanocrystalline materials. *Handbook of Nanostructured Materials and Nanotechnology* 1, 423-480 (2000); Dovy, A. Polyacrylamide gel: an efficient tool for easy synthesis of multicomponent oxide precursors of ceramics and glasses. *Int. J. Inorg. Chem.* 3, 699-707 (2001); Huang, K. & Goodenough, J. B. Wet Chemical Synthesis of Sr- and Mg-Doped LaGaO3, a Perovskite-Type Oxide-Ion Conductor. *J. Sold. State Chem.* 136 274-283 (1998); Aruna, S. T., Muthuraman, M., Patil, K. C. Combustion synthesis and properties of strontium substituted lanthanum manganites $La_{1-x}Sr_xMnO_3$ ($0 \leq x \leq 0.3$). *J. Mater. Chem.* 7, 2499-2503 (1997); and Grigorieva, T. F., Barinova, A. P., Ivanov, E. Yu. & Boldyrev, V. V. *J. Metastable and Nanocrystalline Mat.* 15-16, 553-556 (2003)), the goal of synthesizing fully dense bulk material with grain size below 50 nm remains largely unachieved. This is especially true in the case of ceramic materials. In ceramic materials, the synthesis of bulk nanostructured materials relies mainly on the densification of nanopowders, since alternative routes, such as controlled crystallization of bulk amorphous precursor, have found limited application for these materials (e.g., see Rosenflanz, A., Frey, M., Endres, B., Anderson, T., Richards, E.& Schardt, C. *Nature* 430 761-764 (2004)). As used herein nanopowders refer to materials in powder form having a grain size that is smaller than about 50 nm. The high temperatures required to fully densify ceramic powders result in large grain sizes due to Oswald ripening (e.g., see Cameron, C. P.& Raj Grain growth transition during sintering of colloidally prepared alumina powder compact. *J. Am. Ceram. Soc.* 71, 1031-1035 (1988)).

To overcome this difficulty, unconventional sintering and densification techniques have been proposed for the densification of nanometric ceramic powders. These include, for example, very high pressure-low temperature densification (e.g., see Liao, S. C., Chen, Y.-J., Kear, B. H. & Mayo, W. E. High pressure/low temperature sintering of nanocrystalline alumina. *Nanostruct. Mater.* 10, 1063-1079 (1998); and Liao, S. C., Mayo, W. E. & Pae, K. D. Theory of high pressure/low temperature sintering of bulk nanocrystalline $TiO_2$. *Acta Mater.* 45 4027-4040 (1997)), shock densification (e.g., see Jin, Z. Q., Rockett, C., Liu, J. P., Hokamoto, K., Thadhani, N. N., Shock compaction of bulk nanocomposite magnetic materials, *Materials Science Forum* 465-466, 93-100 (2004)), and magnetic pulsed compaction (e.g., see Ivanov, V., Paranin, S., Khrustov, V., Medvedev, A., Shtol'ts, A., *Key Engineering Materials* 206-213, 377-380 (2002)).

However, while some success was attained by these methods, the results fall short of the ideal goal of having high relative densities (e.g., greater than 95%) and a grain size below 30 nm (e.g., see Tschöpe, A., Sommer, E. & Birringer, R. Grain size-dependent electrical conductivity of polycrystalline cerium oxide. I. Experiment. *Solid State Ionic* 139, 255-265 (2001); and Mondal, P. & Hahn, H. *Ber. Bunsenges. Phys. Chem.* 101, 1765-1766 (1997)). The goal is even more elusive when dense materials with very small grain size (e.g., about 10 nm) are desired. The range of grain size near this value is particularly important since significant variations in bulk physical properties are expected when the grain size approaches this limit (e.g., see Maier, J. Point-defect thermodynamics and size effects. *Solid State Ionics* 131 13-22 (2000)). At approximately this value, half of the atoms belong to the grain boundary region and thus contribute in a different way to the overall property of the material.

Thus far it has not been possible to prepare dense bulk nanostructured material in general and functional oxides in particular with a fine crystallite size of less than about 30 nm.

BRIEF SUMMARY OF THE INVENTION

In one embodiment, the present invention provides a proton conducting thin film having a dense nanometric ceramic material with a relative density of at least about 90% and a grain size of less than about 30 nm, wherein the proton conducting thin film is capable of operating at temperatures of less than about 100° C. in the presence of water vapor.

In other embodiments, the dense nanometric ceramic material is zirconia, ceria, yttrium aluminum garnets, alumina, other functional oxides or combinations thereof. In some other embodiments, the dense nanometric ceramic material is yttria stabilized zirconia, gadolinium-doped ceria or samarium-doped ceria. In still other embodiments, the yttria stabilized zirconia is cubic. In yet other embodiments, the samaria-doped ceria has the formula $Ce_{0.80}Sm_{0.20}O_{2-\delta}$.

In another embodiment, the dense nanometric ceramic material has a relative density of at least about 95 percent. In some embodiments, the dense nanometric material has a relative density of at least about 98 percent.

In other embodiments, the dense nanometric material has a grain size of less than about 20 nm. In some other embodiments, the dense nanometric material has a grain size of less than about 10 nm. In still other embodiments, the dense nanometric material has a grain size of less than about 5 nm.

In some embodiments, the temperature is less than about 75° C. In other embodiments, the temperature is less than about 50° C.

In a second embodiment, the present invention provides an electrochemical device having an anode, a cathode and a proton conducting thin film as described above. In some embodiments, the electrochemical device is fuel cells, batteries, hydrogen separation thin films, PET scintillator or thin film reactors.

In a third embodiment, the present invention provides a method of preparing a dense nanometric ceramic material having a relative density of at least about 90% and a grain size of less than about 10 nm, where the method includes applying an electric current effective to cause heating of a dense nanometric material precursor to a hold temperature, wherein the dense nanometric material precursor is a powder having a grain size of less than about 5 nm in diameter. The method also includes applying to the dense nanometric material precursor a pressure effective to densify the material, while keeping the temperature below a level sufficient to achieve a high degree of compaction and a limited grain growth in the material, thereby preparing the dense nanometric ceramic material having a relative density of at least about 90% and a grain size of less than about 10 nm.

In some embodiments, an electric current level on the order of about 500 to about 3000 amperes is employed. In other embodiments, a pressure of about 500 MPa to about 1 GPa is employed. In some other embodiments, a temperature of about 600° C. to about 950° C. is employed. In still other embodiments, the applying an electric current causes a temperature rise rate of about 50 to about 600° C./min in the dense nanometric material precursor. In yet other embodiments, the dense nanometric material has a relative density of at least about 98 percent.

In another embodiment, the powder comprises metal oxide particles. In other embodiments, the metal oxide particles are simple metal oxide particles or complex metal oxide particles. In some other embodiments, the metal oxide particles are alumina, cerium oxide, doped cerium oxide, yttria, yttria fully-stabilized zirconia, zirconia, or other functional oxides and combinations thereof.

In a further embodiment, the present invention provides the method above holding the nanometric material precursor at the hold temperature and the pressure for a duration of between about 1 min and about 20 min.

In a fourth embodiment, the present invention provides a method of preparing a dense nanometric ceramic material, by applying an electric current of approximately between 1000 and 2000 amperes to a functional metal oxide powder material to cause heating of the metal oxide powder material to a hold temperature. The method also includes applying to the metal oxide powder a pressure in the range between approximately 800 MPa and 1 GPa to densify the material, while keeping the temperature below a level sufficient to achieve a high degree of compaction and a limited grain growth in the material.

In some embodiments, a temperature of about 600° C. to about 950° C. is employed. In other embodiments, the dense nanometric material has a relative density of more than 95 percent.

In a fifth embodiment, the present invention provides a process for preparing a dense nanometric ceramic material having a relative density of at least about 90% and a grain size of less than about 10 nm prepared, the method including applying an electric current effective to cause heating of a dense nanometric material precursor to a hold temperature, wherein the dense nanometric material precursor is a powder having a grain size of less than about 5 nm in diameter. The method also includes applying to the dense nanometric material precursor a pressure effective to densify the material, while keeping the temperature below a level sufficient to achieve a high degree of compaction and a limited grain growth in the material, thereby preparing the dense nanometric ceramic material having a relative density of at least about 90% and a grain size of less than about 10 nm.

For a further understanding of the nature and advantages of the invention, reference should be made to the following description taken in conjunction with the accompanying figures.

BRIEF DESCRIPTION OF THE DRAWINGS

FIG. 8(*b*) shows the reproducibility of dependence of protonic conduction in nanometric YSZ on water vapor pressure.

FIG. 9 (*b*) shows the short-circuit current measured from the electrochemical cell of nanometric YSZ. The circles indicate data obtained from a cell with micrometric YSZ.

DETAILED DESCRIPTION OF THE INVENTION

Figure 1:
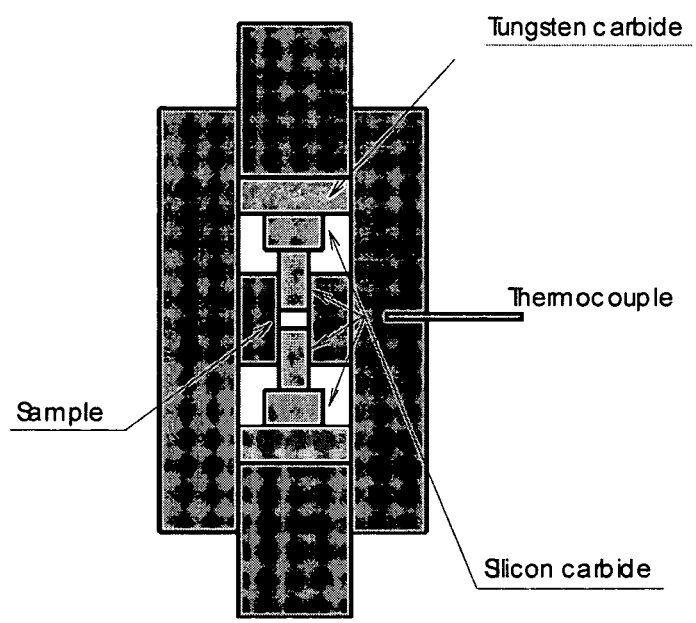
FIG. 1 is an exemplary schematic diagram of a high-pressure die that has been configured for the preparation of dense materials in accordance with the embodiments of the present invention.

I. Method of Preparing a Dense Nanometric Material

Through the use of the methods in accordance with the embodiments of the present invention dense ceramic materials with grain size below 20 nm and approaching 10 nm can routinely be obtained using a high pressure modification of the Spark Plasma Sintering (SPS) technique. The materials produced in accordance with the embodiments of the present invention are the finest-grained ceramics ever prepared in bulk form in the case of fully stabilized zirconia and Sm-doped Ceria. Materials having grain sizes of less than 10 nm can be prepared using powdered starting materials have a particle size of less than about 5 nm. Such powders are commercially available.

In accordance with the methods of the present invention, rapid thermal cycles (e.g., less than about 10 min) coupled with very rapid pressure increases up to about 800 MPa to 1 GPa can be obtained allowing high degree of compaction and very limited grain growth. As used herein, a high degree of compaction refers to compaction resulting in a relative density of at least 90 percent, and typically greater than 95 percent. Also, as used herein, a very limited grain growth refers to grain growth of less than about 50 percent during a compaction process.

SPS has emerged as an effective technique for the sintering and densification of high temperatures materials (e.g., see Tokita, M. *J. Soc. Powder Tech. Jpn.* 30, 790-804 (1993); Shen, Z., Zhao, Z., Peng H. & Nygren, M. Formation of tough interlocking microstructures in silicon nitride ceramics by dynamic ripening *Nature* 417, 266-269 (2002); and Omori, M., Sintering, Consolidation, reaction and crystal growth by the spark plasma system (SPS). *Materials Science and Engineering* A287, 183-188 (2000)). The technique is similar to hot-pressing, although in this case the sample is heated by a high intensity, low voltage pulsed electric current flowing directly through a conductive die, typically made out of graphite. This allows very fast heating rates (e.g., up to 1000° C./min) when compared with traditional hot-press systems. High intensity electric currents have also been shown to produce significant modification in the reactivity in several solid-state systems (e.g., see Conrad, H. Effects of electric current on solid state phase transformations in metals. *Materials Science & Engineering* A287, 227-237 (2000); and Bertolino, N., Garay, J., Anselmi-Tamburini, U & Munir, Z. A. High-flux current effects in interfacial reactions in Au—Al multilayers. *Phil. Mag. B,* 82, 969-985 (2002)). While the presence of short pulses have been suggested to produce plasma discharges enhancing the early stages of sintering (e.g., see Tokita, M. J. Soc. Powder Tech. Jpn. 30, 790-804 (1993)), direct evidence for this has yet to be provided.

In general, the pressure used in the SPS method is limited by the compressive strength of the die material, which for the typical graphite used is about 140 MPa. Such a pressure, when combined with an appropriate thermal and pressure cycle, is adequate to produce fully dense ceramics with grain size between 50 and 100 nm (e.g., see Chaim, R., Shen, Z. & Nygren, M. Transparent nanocrystalline MgO by rapid and low-temperature spark plasma sintering. *J. Mat. Res.* 19, 2527-2531 (2004); and Anselmi-Tamburini, U., Garay, J. E., Munir, Z. A., Tacca, A., Maglia, F. & Spinolo, G. Spark Plasma Sintering and Characterization of Bulk Nanostructured Fully-Stabilized Zirconia (FSZ): I. Densification Studies. *J. Mat. Res.* 19, 3255-3262 (2004)). However, it is not sufficient to obtain nanostructured materials with grain size approaching 10 nm. It has been shown for the densification of fully stabilized (cubic) zirconia that pressure is the parameter with the strongest influence on the final density of nanometric materials (e.g., see Anselmi-Tamburini, U., Garay, J. E., Munir, Z. A., Tacca, A., Maglia, F. & Spinolo, G. Spark Plasma Sintering and Characterization of Bulk Nanostructured Fully-Stabilized Zirconia (FSZ): I. Densification Studies. *J. Mat. Res.* 19, 3255-3262 (2004)).

In order to overcome the limitations in the maximum pressure obtained with a standard SPS setup a double acting die was developed, whose schematic is shown in FIG. 1. With this device a pressure of up to about 800 MPa to 1 GPa on a sample 5 mm in diameter and 1-3 mm thick can routinely be achieved. The maximum pressure can be reached in a few seconds, allowing very fast and versatile sintering cycles. The die is composed of an external graphite die, very similar to the standard die used for SPS. Two protective discs of pure, fully dense tungsten carbide (WC) are placed at the and of each plunger. Since pure WC is not commercially available it was produced using nanometric WC powders, following the conditions reported elsewhere (e.g., see Kim, H.-C., Shon, I.-J., Garay, J. E. & Munir, Z. A. Consolidation and properties of binderless sub-micron tungsten carbide by field-activated sintering. *Int. J. Refrac. Met. Hard Mater.* 22, 257-264 (2004)). The internal smaller die has still a graphite body, but with plungers made out of silicon carbide (commercially available from the Goodfellow Company). It should be noted that larger samples can be made with higher pressure versions of the SPS apparatus with a correspondingly proportional die design, as described above, and that the embodiments of the present invention enable the production of such larger samples.

In accordance with the embodiments of the present invention, during a densification cycles, a moderate pressure (e.g., about 150 MPa) is applied at the beginning of the process. The temperature is then increased with a heating rate of between 50 and 600° C./min. The rise in temperature is accomplished by the application of electric current to the sample. Once the sample reached the hold temperature the pressure was rapidly increased to the final value, up to about 800 MPa to 1 GPa. The sample is held under these conditions for a hold duration of between about 1 min to about 20 min and then the pressure is quickly released and the power turned off. In one embodiment, the hold duration is about 5 min, and the entire densification process takes less then 10 min.

In one embodiment the method of preparing a dense nanometric ceramic material, includes applying an electric current effective to cause heating of the dense nanometric material precursor to a hold temperature; and applying to the dense nanometric material precursor a pressure effective to densify the material, while keeping the temperature below a level sufficient to achieve a high degree of compaction and a limited grain growth in the material. Using this methods, an electric current level on the order of about 500 to about 3000 amperes is employed; a pressure of about 500 MPa to about 1 GPa is employed; and a hold temperature of about 600° C. to about 950° C. is employed. The application of the electric current causes a temperature rise rate of about 50 to about 600° C./min in the dense nanometric material precursor.

Using the methods in accordance with the embodiments of the present invention enables the formation of a dense nanometric material which has a relative density of approximately between 90 and 99 percent. The embodiments of the present invention enable the formation of dense nanometric material having relative densities higher than 95 percent and higher than 98 percent, as well relative densities of nearly 100 percent.

Various dense nanometric ceramic material including zirconia, samarium-doped ceria, yttrium aluminum garnets, alumina, other functional oxides and combinations thereof are made using the methods in accordance with the embodiments of the present invention. These materials are made from simple and complex metal oxide powders, including powders of alumina, cerium oxide, doped cerium oxide, yttria, yttria fully-stabilized zirconia, zirconia, and other functional oxides and combinations thereof. These powders have a grain size of less than 30 nm in diameter.

Figure 2:
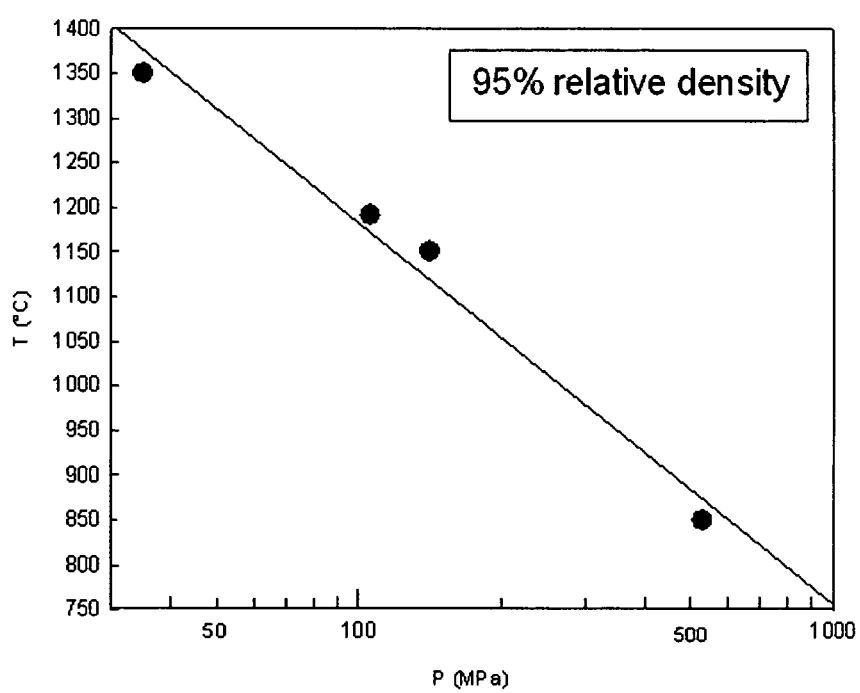
FIG. 2 is a graph showing the relationship between hold temperature and the applied pressure required to obtain samples with a relative density of 95% in the case of nanometric fully stabilized zirconia (8% $Y_2O_3$), for a hold time of 5 min.

An indication of the influence of pressure on the densification of nanopowders at low temperatures can be seen from FIG. 2 for the SPS densification of nanometric cubic zirconia. This figure (FIG. 2) shows the pressure required to obtain a sample with a relative density of 95% increases exponentially when the temperature is decreased. (Note: the figure is semi-log plot) On the other hand, it has been shown that the grain size in fully stabilize zirconia decreases exponentially with temperature (e.g., see Anselmi-Tamburini, U., Garay, J. E., Munir, Z. A., Tacca, A., Maglia, F. & Spinolo, G. Spark Plasma Sintering and Characterization of Bulk Nanostructured Fully-Stabilized Zirconia (FSZ): I. Densification Studies. *J. Mat. Res.* 19, 3255-3262 (2004)). FIG. 2 shows that in order to keep the temperature below 850° C., a temperature where the diffusivity (and the grain growth) becomes significant, a pressure of about 0.5 GPa is required, while temperatures around 800° C. require a pressure of about 0.8 GPa. Table I, below, lists the characteristics of some of the materials obtained using the high-pressure SPS(HP-SPS) technique in accordance with the embodiments of the present invention. The grain size have been measured from scanning electron microscope (SEM) pictures, while the densities have been determined using the Archimedes method. The powders have been obtained using different wet-chemistry techniques, following the methods described in the papers referenced in the table.

| Material | Starting powder grain size (nm) | Preparation method (Ref) | Heating rate (° C./min) | Hold temper. (° C.) | Hold pressure (MPa) | Hold time (min) | Relative density (%) | Grains size (nm) |
|---|---|---|---|---|---|---|---|---|
| CeO$_2$ | 7 | a | 200 | 625 | 600 | 5 | >98 | 11.5 |
| Ce$_{0.7}$Sm$_{0.32}$ | | b | 200 | 750 | 610 | 5 | >98 | 16 |
| YFSZ (8%) | 6.6 | c | 200 | 850 | 530 | 5 | >98 | 15.5 |

Figure 3:
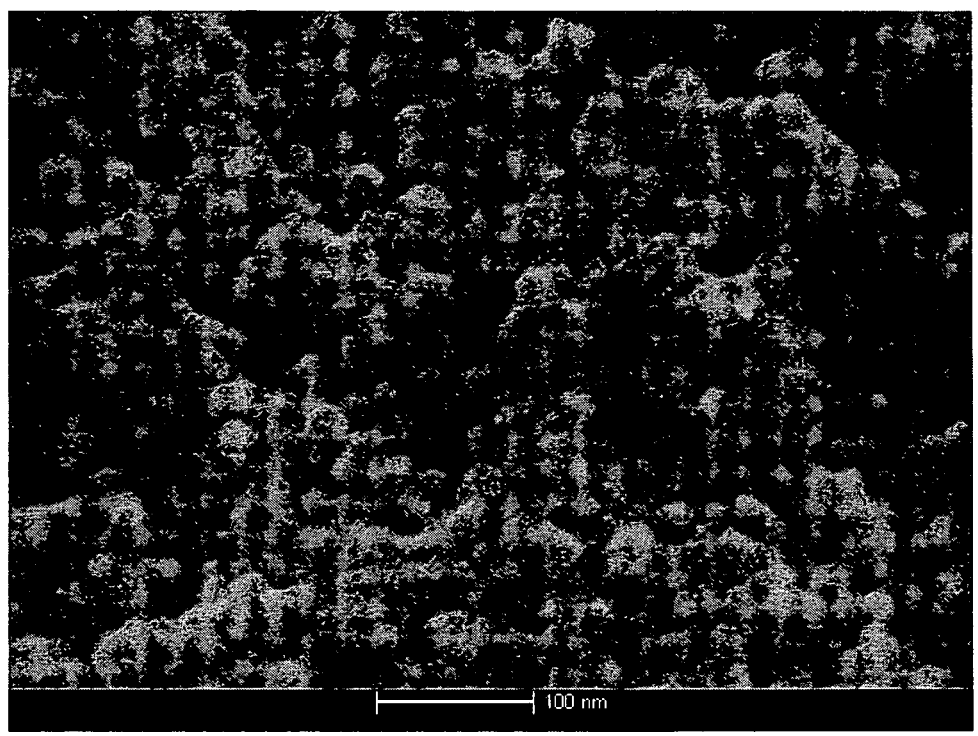
FIG. 3 is an SEM micrograph of a fully stabilized zirconia (8% $Y_2O_3$) densified at 850° C. and 530 MPa. Hold time: 5 min. (Zry3-HP5-2).
Figure 4:
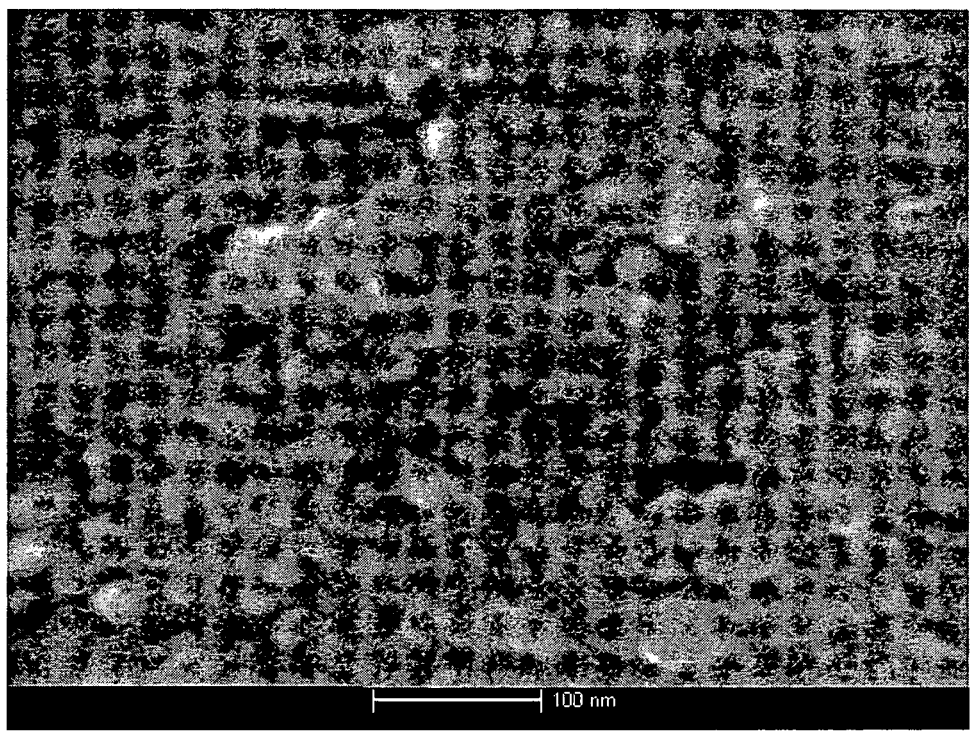
FIG. 4 is an SEM micrograph of cerium oxide doped with 30 mol % samaria densified at 750° C. and 530 MPa. Hold time: 5 min. (CeOSm—NH3-HP5-1).
Figure 5:
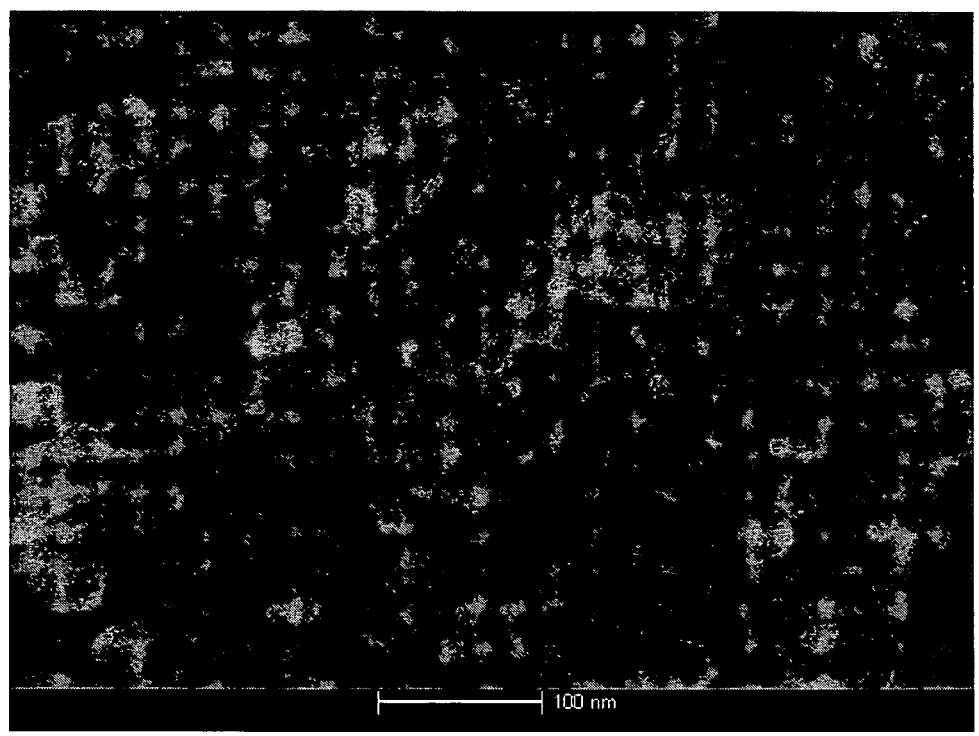
FIG. 5 is an SEM micrograph of pure cerium oxide densified at 625° C. and 600 MPa. Hold time: 5 min. ($CeO_2$-8L-SPSHP5-3).

[a]Kim, S., Maier, J., Partial electronic and ionic conduction in nanocrystalline ceria: role of space charge. *J. Eu. Ceram. Soc.* 24, 1919-1923 (2004)
[b]Anselmi-Tamburini, U., Munir, Z. A, unpublished work
[c]Anselmi-Tamburini, U., Munir, Z. A, unpublished work a: Kim, S., Maier, J., Partial electronic and ionic conduction in nanocrystalline ceria: role of space charge. *J. Eu. Ceram. Soc.* 24, 1919-1923 (2004)

b: Anselmi-Tamburini, U., Munir, Z. A, unpublished work c: Anselmi-Tamburini, U., Munir, Z. A, unpublished work Table I above shows that the grain growth is limited and the final grain size is controlled mainly by the grain size of the starting powders. When powders with grain size below 10 nm are used, dense samples with grain size of around 15 nm have been obtained. These results have been reproduced using three different materials: fully-stabilized zirconia (8% mol yttria), pure ceria, and ceria doped with 30% samaria. Other materials have been obtained with larger grain size, but always quite close to the size of the staring powders. FIGS. 3-5 show three SEM images of the samples characterized by the smaller grain size. All three materials show a uniform microstructure with grain size around 15 nm. In all of these cases the starting powders show some degree of agglomeration, but the densification procedure was effective in the elimination of close macroporosity typically associated with the presence of agglomerates in nanopowders. FIGS. 3-5 also show also a very low level of nanoporosity with good connections between the grains.

The methods in accordance with the embodiments of the present invention enable the formation of dense nanometric material from simple and complex metal oxide powders, such as powders of alumina, cerium oxide, doped cerium oxide, yttria, yttria fully-stabilized zirconia, zirconia, garnets, titanium oxides, magnesium oxides, tin oxides, aluminum oxides and other functional oxides, including for example those used for device applications such as functional oxides used for fuel cell devices, laser applications, and those used for chemical and other sensor applications, and combinations thereof. Methods for preparing these materials in a thin film are described below.

II. Proton Conducting Dense Nanometric Material

The embodiments of the present invention provide a proton conducting thin film comprising a dense nanometric ceramic material having a relative density of at least about 90% and a grain size of less than about 30 nm, wherein the proton conducting thin film is capable of operating at temperatures of less than about 100° C. in the presence of water vapor.

The dense nanometric ceramic material of the embodiments of the present invention can be any appropriate ceramic, such as those described above. Various dense nanometric ceramic material including zirconia, samarium-doped ceria, yttrium aluminum garnets, alumina, other functional oxides and combinations thereof are made using the methods in accordance with the embodiments of the present invention. These materials are made from simple and complex metal oxide powders, including powders of alumina, cerium oxide, doped cerium oxide, yttria, yttria fully-stabilized zirconia, zirconia, and other functional oxides and combinations thereof. These powders can have a grain size of less than 30 nm in diameter.

Using the methods in accordance with the embodiments of the present invention enables the formation of a dense nanometric material which has a relative density of approximately between 90 and 99 percent. The embodiments of the present invention enable the formation of dense nanometric material having relative densities higher than 95 percent and higher than 98 percent, as well relative densities of nearly 100 percent.

Figure 6:
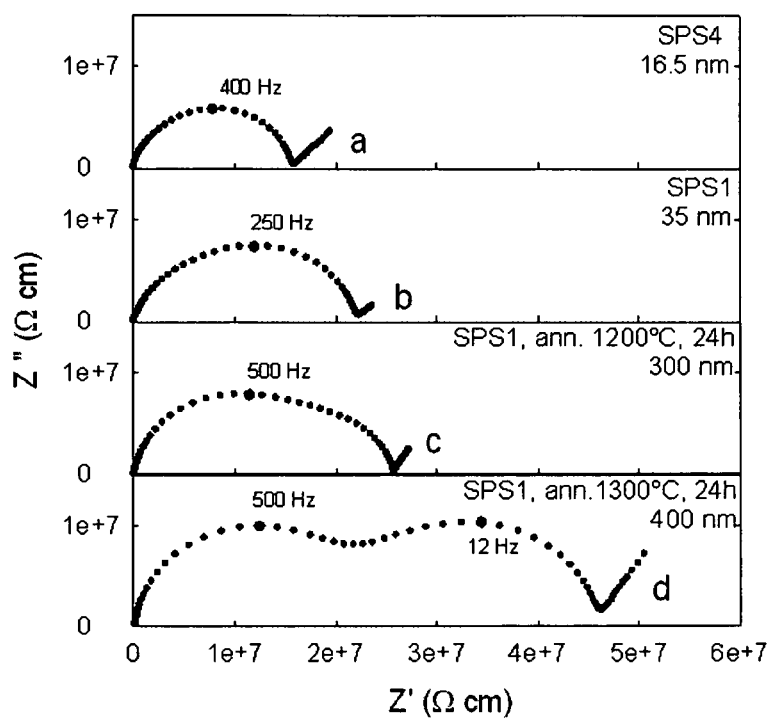
FIG. 6 shows the impedance spectra of consolidated samples of ceria doped with 30 mol % Samaria showing the effect of grain size: 16.5 nm (a); 35 nm (b); 300 nm (c) and 400 nm (d). All patterns measured at 200° C.

Ionic conductivity was verified by the lack of variation in the resistivity with oxygen partial pressure in the range $1 > p_{O2} > 10^{-8}$ atm at 700° C. (Tschöpe, A., Solid State Ionics, 139, 267-280 (2001)). The total conductivity of samples with a grain size <20 nm is approximately a factor of two higher than the bulk conductivities in microcrystalline samples. The activation energy, $E_a$, for these samples, about 1 eV, is consistent with literature reports for highly doped ceria (Jung, G. B., Huang, T. J. and Chang, C. L., J. Solid State Electrochem., 6, 225-230 (2002)). It is important to note that the measured conductivities per literature reports for the reference sample are only for the bulk component (i.e., excluding the grain boundary contribution) while those from nanometric samples made in accordance with the principles of the present invention, are the total conductivities. The dependence of the AC impedance characteristics on grain size was demonstrated by subsequent annealing experiments, which resulted in samples with grain size as high as 400 nm (Anselmi-Tamburini, U., Maglia, F., Chiodelli, G. et al., Adv. Functional Mater). The evolution of the impedance spectrum with grain size is shown in FIG. 6 for grain size ranging from 16.5 to 400 nm. As the grain size increases a second semicircle at lower frequencies appears and for the sample with a grain size of 400 nm the spectrum resembles patterns of typical ceramic materials with two well resolved semicircles, attributed to the bulk and to the grain boundary.

Powders of the desired nanostructured electroceramics include, but are not limited to, yttria stabilized zirconia and ceria. These nanostructured electroceramics can optionally be dopes with a variety of materials include, but are not limited to, Gd and Sm. In addition, the nanostructured electroceramics can be synthesized with very small grain size, S≤5 nm.

Consolidation of the nanometric powders can be made by field activated sintering utilizing a modified pulse electric current sintering (PECS) method [Munir et al., J. Mater. Sci., 41, 763-777 (2006)]. Experimental observations have shown that an increase in pressure results in an increase in the final density with no increase in crystallite size [M. C. Martin and M. L. Mecartney, Solid State Ionics, 161, 67-79 (2003)]. This suggests that through the use of higher pressure, dense nanocrystalline materials can be formed at lower temperatures, thus enabling the obtaining of even smaller crystallite size. Pressures of up to 1 GPa can be used. Ceria samples with different dopant levels can be prepared. While the possible role of oxygen vacancies is not yet fully known, the possible role of oxygen vacancies in the incorporation of water and hence protonic conductivity can be determined by measuring water uptake by gravimetric methods.

Consolidated materials can be characterized by high-resolution scanning electron microscopy (HRSEM) to determine grain size. Grain size can also be determined through x-ray line broadening analysis [Paris et al., J. Mater. Res., 18, 2331-2338 (2003)]. High-resolution transmission electron microscopy (HRTEM) can be utilized to determine possible grain boundary segregation of impurity or dopant species [Lei et al., J. Am. Ceram. Soc., 85, 2359-2363 (2002)].

Figure 7:
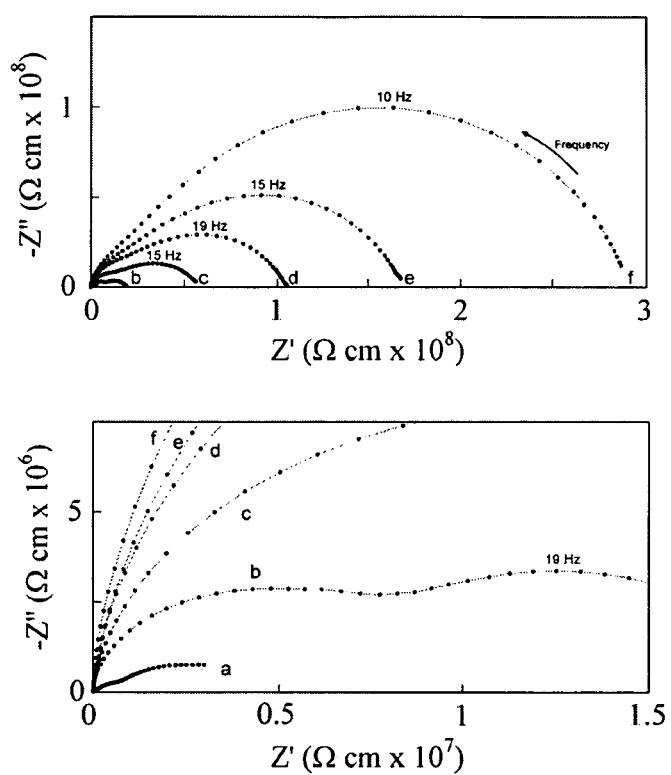
FIG. 7 shows the impedance patterns of YSZ (8 mol %) sample conditioned in air saturated with water at room temperature for 400 h (curve a). The figure shows the evolution of the pattern resulting from annealing of the sample at 200° C. in dry oxygen for 10 min (b), 20 min (c), 30 min (d), 40 min (e), and 80 min (f).

Fully-stabilized zirconia (8 mol % of yttria) with a grain size 15.5 nm and a density of greater than 98% was prepared by the method described above. The AC impedance pattern measured at 200° C. of a typical sample (after annealing at 650° C. in oxygen for 20 h) showed the dominance of the grain boundaries, with the only indication of the bulk semicircle is a slight deformation of the main semicircle near the origin (Kreuer, K. D., Chem. Mater, 8, 610-641 (1996)). When these nanometric samples are exposed to moisture at room temperature for 400 h a marked change in the electrical properties was observed, as can be seen in FIG. 7 (curve a). The two semicircles shrink dramatically, deform slightly (with the center lying below the x-axis) and become less resolved. The change in resistivity involves both bulk and grain boundary semicircles, suggesting that the modification by the hydration process relates to both conduction processes. The treated sample (FIG. 7, curve a) showed an overall conductivity that is almost 2 orders of magnitude higher than the conductivity of the sample before exposure to moisture. When heated at 200° C. in dry oxygen, the conductivity slowly returned towards values obtained before the treatment in the moist environment in both its bulk and grain boundary components (FIG. 7, curves "b" through "f"). And with heating in dry oxygen at a higher temperature (650° C.) for several hours, the sample returned to the original conductivity values. This behavior is similar to what was observed in other protonic conductors (Kreuer, K. D., Chem. Mater., 8, 610-641 (1996); Kreuer, K. D., Ann. Rev. Mater. Res., 33, 333-359 (2003); Shi, C., Yoshino, M. and Morinaga, M., Solid State Ionics, 176, 1091-1096 (2005)) and was reproducible through cycling (Anselmi-Tamburini, U., Maglia, F., Chiodelli, G. et al., Appl. Phys. Lett., 89, 163116-163116 (2006)). A similar behavior was also observed when the samples were exposed at different temperatures to a gas saturated with water at room temperature. In the temperature range between room temperature and 200° C., a significant increase in the conductivity, up to 7 orders of magnitude, was observed and remained stable at each temperature. Thermogravimetric analysis of a typical sample (after hydration at room temperature for 400 h) confirmed the uptake of moisture in the nanometric sample and its absence in a sample with grain size in the micrometric range. And experimental steps taken, along with BET measurements appear to preclude the probability of surface or pore transport (Anselmi-Tamburini, U., Maglia, F., Chiodelli, G. et al., *Appl. Phys. Lett.*, 89, 163116-163116 (2006)).

Figure 8:
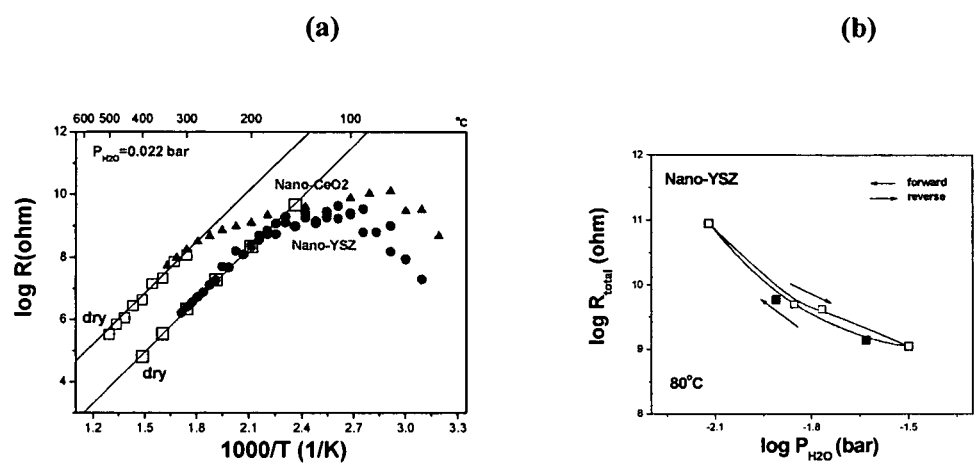
FIG. 8(*a*) shows the protonic conduction in nanometric YSZ and ceria. The solid line shows expected oxygen ionic resistance in the temperature range of interest.

Conductivity measurements on this material at $p_{H2}$=0.022 bar show typical behavior of protonic conduction below 150° C., as seen in FIG. 8 (*a*), where the temperature dependence of the resistance is shown. Also shown in FIG. 8 (*a*) is a result obtained from nominally pure nanometric ceria with a grain size of about 20 nm. Note that the low-temperature conduction behavior of the ceria resembles that of nanometric YSZ. Qualitatively similar protonic conductivity behavior has been reported for unconsolidated (loose) YSZ powder (Raz, S., Sasaki, K., Maier, J. et al., *Solid State Ionics*, 143, 181-204 (2001)). The reproducibility of the resistance of nano-YSZ with changing partial pressure of $H_2O$ is shown in FIG. 8 (*b*). At any given partial pressure of $H_2O$, the resistance of the nano-YSZ material is the same whether the water partial pressure is increasing or decreasing.

Water incorporation into fluorite-structured oxygen conducting solid electrolytes such as YSZ in humid atmosphere has been known. It was found that the incorporation kinetics is even faster than those of oxygen gas in YSZ ceramics (Sakai, N., Yamaji, K., Negishi, H. et al., *Electrochemistry*, 68, 499-503 (2000)). A noticeable conductivity effect of the proton on the overall ionic conductivity of YSZ ceramics at conventional measuring temperatures (>250° C.), however, has not been observed. On the other hand, Raz et al. reported that in the case of unconsolidated (loose) YSZ powders the proton conduction takes place through the surface even at very low temperature (<100° C.) and suggested a possible conduction mechanism (Raz, S., Sasaki, K., Maier, J. et al., *Solid State Ionics*, 143, 181-204 (2001)).

As indicated above, it was shown recently that YSZ ceramics with the grain size of about 15 nm absorb a significant amount of water even at room temperature and conduct proton below 100° C. (Anselmi-Tamburini, U., Maglia, F., Chiodelli, G. et al., *Appl. Phys. Lett.*, 89, 163116-163116 (2006)). The measured protonic conductivity was in the range of conventional high temperature protonic conductors. While not being limited to any specific theories, it is believed that the protonic conduction in the nanometric YSZ of the embodiments of the present invention can take place through the grain boundary since only the ceramics with such a small grain size show distinctive protonic conductivity.

Ceramics used in solid electrolytes (SEs) are polycrystalline forms made up of an assemblage of typically few micron-sized crystallites (grains) joined to one another at grain boundaries. The disruption of the periodicity of the grains in the grain boundary is adjusted by strained or missing bonds so that the structure of the grain boundary differs from that of the grain. This leads to changes in concentrations and mobility of the charge carriers (e.g., oxygen vacancies in oxygen conducting SEs), and thus their conduction behavior in the grain boundary of a polycrystalline ceramic.

The grain boundaries are either serial or parallel to the current flow as far as their geometry is concerned. The grain boundaries serial to the current flow (i.e., serial grain boundaries) often block the ionic current in SEs (Aoki, M., Chiang, Y. M., Kosacki, I. et al., *J. Am. Ceram. Soc.*, 79 (5), 1169-1180 (1996); Guo, X., *J Am. Ceram. Soc.*, 86, 1867-1873 (2003)). This blocking effect of the serial grain boundaries can be attributed to either extrinsic (Aoki, M., Chiang, Y. M., Kosacki, I. et al., *J. Am. Ceram. Soc.*, 79 (5), 1169-1180 (1996)) (e.g., insulating amorphous impurity phase) or intrinsic (Kim, S., Fleig, J. and Maier, J., *Phys. Chem. Phys.*, 5 2268-2273 (2003); Guo, X., *J. Am. Ceram. Soc.*, 86, 1867-1873 (2003), Guo, X. and Maier, J., *J. Electrochem. Soc.*, 148, E121-E126 (2001); Denk, I., Claus, J. and Maier, J., *J. Electrochem. Soc.*, 144, 3526-3536 (1997); Rodewald, S., Fleig, J. and Maier, J., *J. Am. Ceram. Soc.*, 84, 521-530 (2001)) causes (e.g., space charge effects) or both.

On the other hand, the contribution from grain boundaries parallel to the current flow (i.e., parallel grain boundaries) to the overall conductance is normally ignored in conventional micrometric SEs since the fraction of their cross sectional area is negligibly small compared to that of the grains. However, this is no longer true for nanostructured ceramics. The thickness of the grain boundary is comparable to the grain size so that the parallel grain boundaries can serve as highly conductive pathways if either the charge carrier concentrations or the mobility of the charge carriers or both are increased in the parallel grain boundaries.

One of the first demonstrations of the parallel conduction that results in enhancement in ionic conductivity is the LiI:$Al_2O_3$ composite (Liang, C. C., *J. Electrochem. Soc.*, 120, 1289-1292 (1973)). In this system, the Li ions accumulate in the vicinity of the $Al_2O_3$ surface to form highly conductive grain boundary. As a result the parallel grain boundary conducts more Li ions and the Li ion conductivity was enhanced by nearly two orders of magnitude in the LiI:$Al_2O_3$ composite compared to pure LiI. Recently, Maier and co-workers reported enhanced $F^-$ conductivity in epitaxially grown planar heterostructures of $CaF_2$/$BaF_2$ films (Sata, N., Eberman, K., Eberl, K. et al., *Nature*, 408, 946-948 (2000)). In this study the ionic conductivity increased with increasing the periodicity of the alternating films. Near the contact between $BaF_2$ and $CaF_2$, fluoride ions in $BaF_2$ transfer to the adjacent $CaF_2$ across the contact leaving their vacancies in $BaF_2$ to form space charge zones. The enhanced conductivity is attributed to the enhancement in the number of $F^-$ ions at the parallel space charge zones between $CaF_2$ and $BaF_2$ that was expected due to thermodynamic reasons. These examples demonstrate how grain boundary engineering, by control of size can be used to modify the properties of solid-state ionic conductors.

Kim et al. investigated the conduction mechanism of nanometric (grain size ~30 nm) fluorite structured SEs in detail (Kim, S., Fleig, J. and Maier, J., *Phys. Chem. Chem. Phys.*, 5, 2268-2273 (2003); Kim, S., Fleig, J. and Maier, J., *Phys. Chem. Chem. Phys.*, 5, 2268-2273 (2003)). Dramatic increase in the electrical conductivity of nano-grained ceria ceramics was triggered by the fact that nominally pure samples (grain size <50 nm) showed significantly enhanced electronic conductivity compared with a single crystal or micrometric ceria samples (Chiang, Y. M., Lavik, E. B., Kosacki, I. et al., *Appl. Phys. Lett.*, 69, 185-187 (1996); Kim, S., Fleig, J. and Maier, J., *Phys. Chem. Chem. Phys.*, 5, 2268-2273 (2003); Tsch6pe, A., *Solid State Ionics*, 139, 267-280 (2001); Hwang, J. H. and Mason, T. O., *Z. Phys. Chem.*, 207, 21-38 (1998); Kosacki, I., Suzuki, T., Petrovski, V. et al., *Solid State Ionics*, 136-137, 1225-1233 (2000)). This was attributed to possibly higher electronic conductivity at the grain boundaries than that in the bulk since nano-grained samples have such a high density of grain boundaries.

Kim and Maier performed detailed AC impedance measurements on nominally pure and Gd-doped nano-grained ceria (Kim, S., Fleig, J. and Maier, J., *Phys. Chem. Chem. Phys.*, 5, 2268-2273 (2003)). In conjunction with DC polarization techniques, a quantitative analysis was performed of the measured oxygen partial pressure and temperature dependences of the partial electronic and ionic conductivities of nominally pure and Gd-doped nano-grained ceria based on the space charge models. It was verified that the space charge controlled the electrical conduction in nano-grained ceria by demonstrating that the ionic conductivity at the grain boundary is depressed while the electronic conductivity is enhanced due to the existing positive charge in the grain boundary core.

Recently direct experimental evidence of electron accumulation in the space charge zones in nanocrystalline Y-doped zirconia ceramics has been provided by comparing the bulk and the grain boundary resistivities measured on a reduced sample with those obtained from an oxidized sample (Lee, J. S., Anselmi-Tamburini, U., Munir, Z. A. et al., *Solid State Lett.*, 9, J34437 (2006)). The results for 2.44 mol % Y-doped zirconia (2YZ) sample indicated that the excess electrons, deliberately introduced by reducing the sample, segregate almost exclusively to the space charge zones. This leads to the change in the overall grain boundary conduction from pure ionic to mixed conduction and thus to enhancement in the grain boundary conductivity the YSZ.

Nanometric thin films useful in the embodiments of the present invention can be made by a variety of methods known to one of skill in the art. The nanometric materials of the thin film can have grain sizes of less than 10 nm. Such thin films are prepared using powders having very small grain sizes, such as less than 5 nm. In some embodiments, the thin films are prepared using pulsed laser deposition (*J. Mater. Sci.* 2007, 42, 1931, incorporated in its entirety herein). The pulsed laser deposition method can be used to prepare thin films having a variety of grain sizes. Another method of preparing a proton conducting thin film comprising a dense nanometric ceramic material is via spin-coating (*J. Am. Ceramic Soc.* 2005, 88(7), 1747, incorporated in its entirety herein). One of skill in the art will appreciate that other methods of making the thin films of the embodiments of the present invention are useful in the present invention.

III. Electrochemical Device

The embodiments of the present invention also provide an electrochemical device having an anode, a cathode and a proton conducting thin film comprising a dense nanometric ceramic material having a relative density of at least about 90% and a grain size of less than about 30 nm, wherein the proton conducting thin film is capable of operating at temperatures of less than about 100° C. in the presence of water vapor.

Electrochemical devices useful in the embodiments of the present invention include, but are not limited to, fuel cells, batteries, hydrogen separation thin films, PET scintillator and thin film reactors. One of skill in the art will appreciate that other electrochemical devices are useful in the present invention.

The instant invention demonstrates that doped zirconia and ceria (and other similar oxide materials), when present in the low nanoscale, can exhibit protonic conductivity at low temperature. Protonic conducting zirconia (and similar oxides) is attractive because of its chemical and mechanical stability, relative to that of other conventional protonic conductors. Low temperature is also advantageous due to lower power requirements and reduction of adverse chemical interactions between the materials.

To provide additional evidence for protonic conductivity in YSZ, other experiments were carried out. These included electromotive force (emf) cell measurements with open circuit for voltage determination and closed circuit for current determination. The results indicate that conduction occurs at room temperature. Also, Secondary Ion Mass Spectrometry (SIMS) measurements showed the presence of deuterium in a sample treated with $D_2O$.

Figure 9:
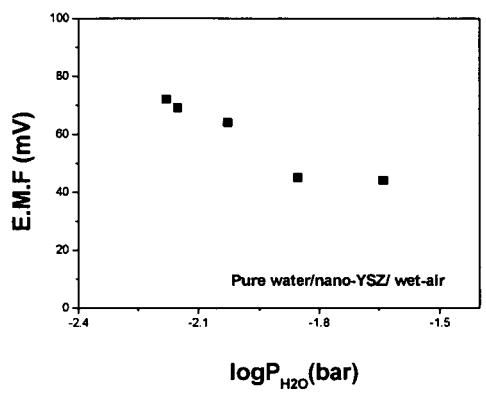
FIG. 9 (*a*) shows the measured emf from an electrochemical cell of nanometric YSZ as a function of water partial pressure at the cathode side. The anode side of the cell was exposed to pure water.
Figure 9:
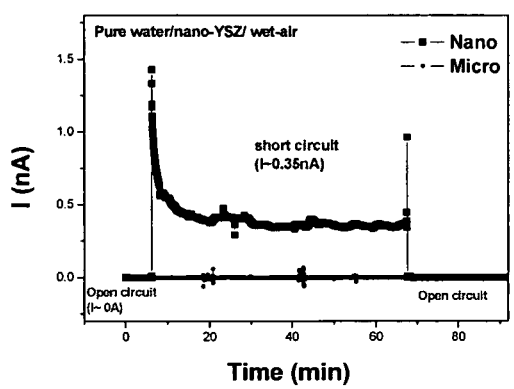

The emf of an electrochemical cell of the sample (pure water, Pt/nano-YSZ/Pt, wet-air) was measured and the results are shown in FIG. 9(*a*). One side of the cell was dipped into deionized water and the other side of the cell was exposed to wet-air with different water partial pressures ($P_{H2O}$). The emf measured from the cell at $P_{H2O}=6.6\times10^{-3}$ bar at the cathode side is ~72 mV and decreases with increasing $P_{H2O}$. Such a decrease is expected since the $P_{H2O}$ gradient across the cell decreases with increasing $P_{H2O}$ at the cathode side. In addition, a current of about 0.35 nA was measured from the cell when short-circuited (see FIG. 9 (*b*)). On the other hand, neither emf nor a current was detected from a cell made with microcrystalline YSZ as can be seen in FIG. 9(*b*). It is important to point out that the electrode kinetics are rapid with changes occurring rapidly when the cell conditions are changed. The emf results are consistent with those obtained from TGA showing the absence of water adsorption in microcrystalline YSZ (Anselmi-Tamburini, U., Maglia, F., Chiodelli, G. et al., *Appl. Phys. Lett.*, 89, 163116-163116 (2006)). These observations provide additional confirmation for the occurrence of protonic conduction in nanometric YSZ at room temperature. Emf measurements made were also made on ceria doped with 20 mol % Samaria. For the ceria doped materials, an emf of ~100 mV was measured, indicating that phenomenon was not an isolated event.

Figure 16:
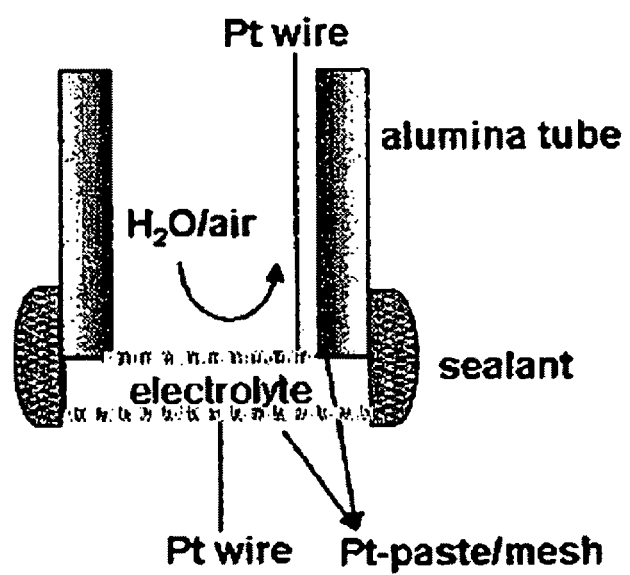
FIG. 16 shows a diagram of a cell of one embodiments of the present invention (Adv. Mat. 2008, 20, 556).

The electrochemical cell useful in embodiments of the present invention can be any electrochemical cell. In some embodiments, the electrochemical cell includes a tube, such as an alumina tube, with the proton conducting thin film comprising a dense nanometric ceramic material of the embodiments of the present invention at the terminus of the tube and in contact with the contents inside the tube and outside the tube (see FIG. 16, Adv. Mat. 2008, 20, 556, incorporate herein by reference). Inside the alumina tube, the cathode can be of any suitable material, such as a platinum wire. The cathode can be attached to the interior portion of the electrolyte layer. The anode can be attached to the exterior portion of the electrolyte material and can be any suitable material, such as a platinum wire. The humidity of the atmosphere inside the tube can be controlled as needed.

Figure 10:
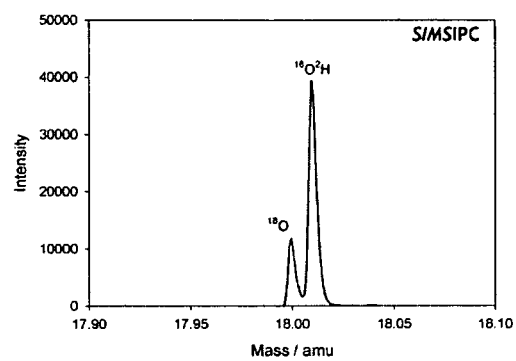
FIG. 10 shows the SIMS spectrum of nano-crystalline YSZ exposed to $D_2O$-saturated air. The negative ion $^{16}O^2H^-$ in the mass spectrum indicates the incorporation of deuterium, $^2H$.

To provide confirmation for the incorporation of hydrogen in nanocrystalline YSZ with ultra-small grain sizes, qualitative SIMS measurements were performed with samples prepared by pulsed electric current sintering (PECS). The samples were kept for 17 h at a temperature of 70° C. in a flowing atmosphere of air that was saturated with $D_2O$ at 25° C. ($pD_2O=0.03$ bar). The negative ion $^{16}O^2H^-$ in the SIMS analysis, shown in FIG. 10, indicates the incorporation of deuterium, $^2H$, thus demonstrating the existence of deuterium in the sample.

Devices useful in the embodiments of the present invention include, but are not limited to, hydrogen separation, hydrogen generation and sensor applications. Such devices can be prepared according to methods known in the art, such as described in *Thin Solid Films* 2007, 515(18), 7342; *Materials Research Society Symposium Proceedings* 2007, 972 (Solid State Ionics, 2006), 3; *Ionics* 2007, 13(3), 183; and *Sensors and Actuators, B: Chemical* 2007, B125(2), 435. These references are incorporated in their entirety herein. One of skill in the art will appreciate that other methods of making the devices of the present invention are useful in the present invention.

IV. Examples

Example 1

Preparation of Proton Conducting Thin Film with Nanometric Materials

The thin films of the embodiments of the present invention can be prepared by methods known in the art, such as via pulsed laser deposition as disclosed in *J. Mater. Sci.* 2007, 42, 1931, or via spin-coating as disclosed in *J. Am. Ceramic Soc.* 2005, 88(7), 1747.

Figure 11:
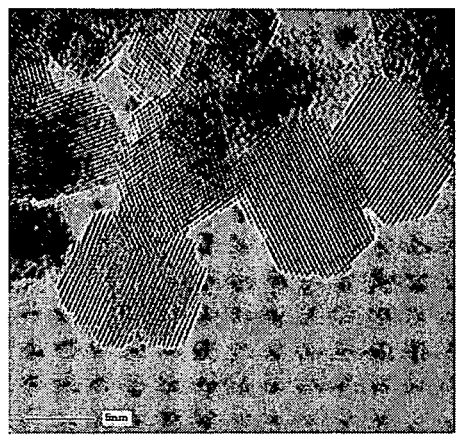
FIG. 11 shows a high resolution transmission electron microscope (HR-TEM) image of Nanocrystalline $CeO_2$.

FIG. 11 shows a high resolution transmission electron microscope (HR-TEM) image of Nanocrystalline $CeO_2$ prepared by this method.

Figure 12:
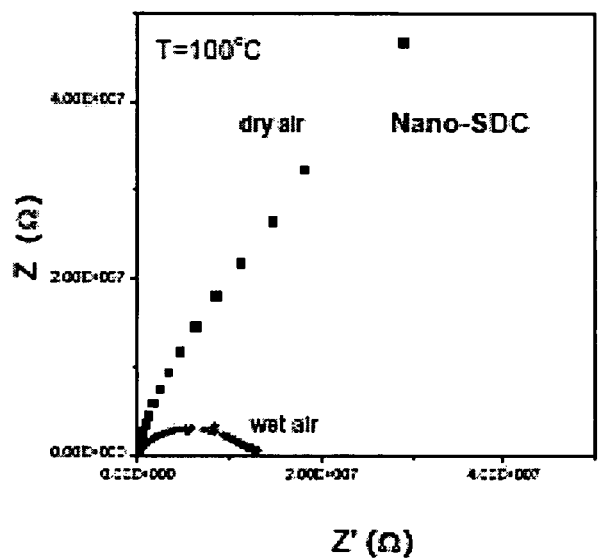
FIG. 12 shows a representative impedance spectrum of a nanostructured 20 mol % Sm-doped $CeO_2$ (nano-SDC) measured at 100° C. under dry and wet atmosphere. The figure shows that the resistance of the sample drastically reduced under wet air.

Materials prepared by the method of the present invention show a resistance that can be drastically reduced under wet air (FIG. 12). For example, the impedance spectrum of a nanostructured 20 mol % Sm-doped $CeO_2$ (nano-SDC) measured at 100° C. under dry and wet atmosphere in FIG. 12 demonstrates that the resistance is dramatically reduced in wet air.

Figure 13:
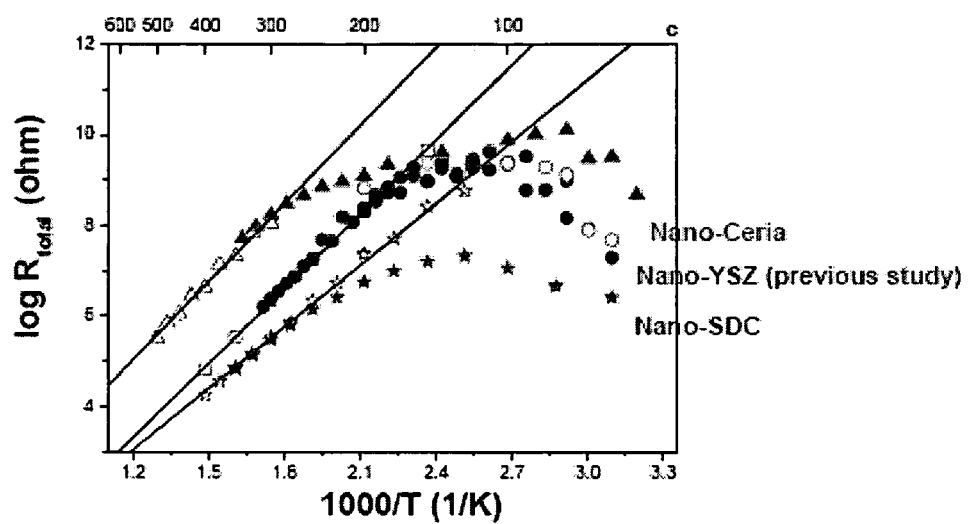
FIG. 13 shows the protonic conductivity of the nano-SDC as a function of temperature. For comparison, also shown are the data for both nominally pure nanostructured ceria (nano-ceria) and nanostructured yttria (8 mol %) stabilized zirconia (nano-YSZ). The protonic conductivity of nano-SDC is over 2 orders of magnitude higher than that of nano-ceria in the temperature below 200° C. This result indicates that the oxygen vacancy concentration in the materials is a parameter useable to control the protonic conductivity of the nanostructured sample.

The protonic conductivity of the nano-SDC operates as a function of temperature (FIG. 13). Shown in FIG. 13 for comparison, are the data for both nominally pure nanostructured ceria (nano-ceria) and nanostructured yttria (8 mol %) stabilized zirconia (nano-YSZ). The protonic conductivity of nano-SDC is over 2 orders of magnitude higher than that of nano-ceria in the temperature below 200° C. This result indicates that the oxygen vacancy concentration in the materials is a parameter useable to control the protonic conductivity of the nanostructured sample.

Figure 14:
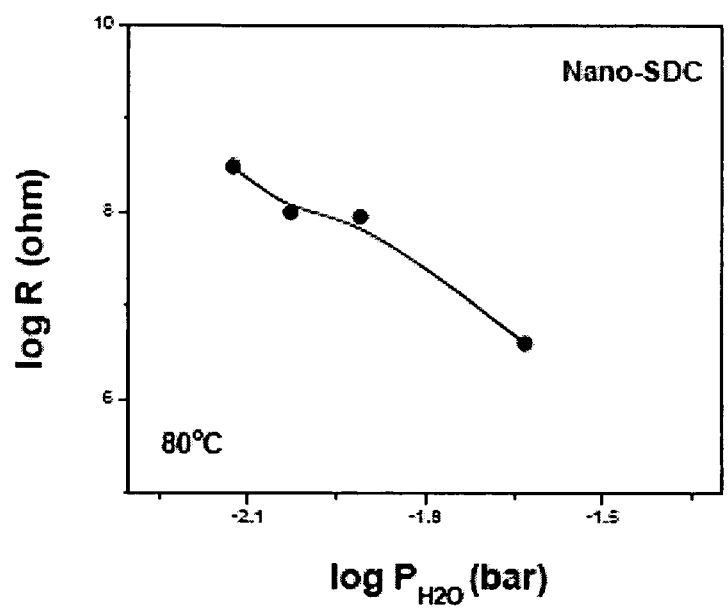
FIG. 14 shows the resistance of nano-SDC as a function of water partial pressure ($P_{H_2O}$) at 80° C. The resistance decreases with increasing $P_{H_2O}$, confirming the proton conduction in the sample.

Confirmation of the proton conduction of the sample is shown in FIG. 14, where the resistance of nano-SDC as a function of water partial pressure ($P_{H_2O}$) at 80° C. decreases with increasing $P_{H_2O}$.

Figure 15:
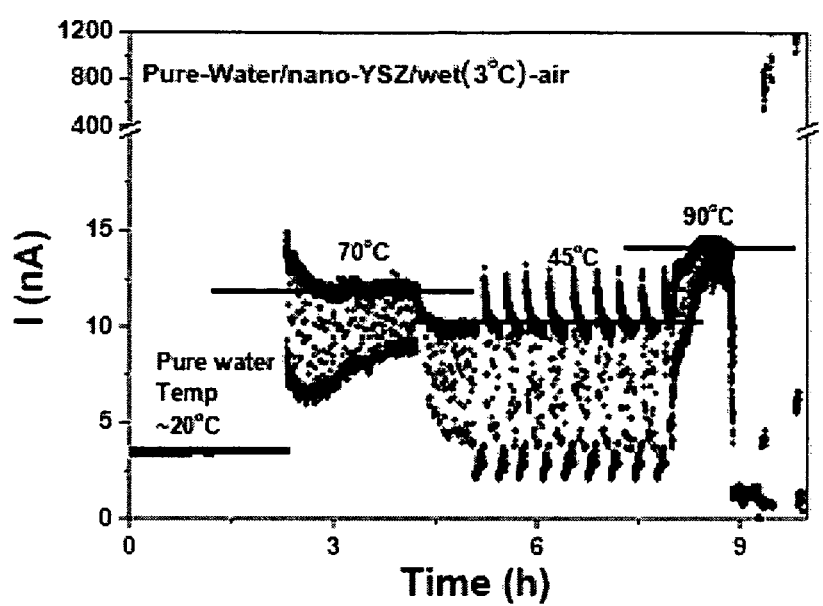
FIG. 15 shows that the closed circuit current measured from a water concentration cell of nano-YSZ increases with increasing water temperature. The water partial pressure of the cathode (inner part of the cell) is ~$1.3 \times 10^{-2}$ atm while the anode (outer part of the cell) is exposed to de-ionized water. The measured currents at different temperatures are: 3.5 nA at 20° C.; 12.2 nA at 70° C.; 10 nA at 45° C.; and 14.6 nA at 90° C.

FIG. 15 shows that the closed circuit current measured from a water concentration cell of nano-YSZ increases with increasing water temperature. The water partial pressure of the cathode (inner part of the cell) is ~$1.3 \times 10^{-2}$ atm while the anode (outer part of the cell) is exposed to de-ionized water. The measured currents at different temperatures are: 3.5 nA at 20° C.; 12.2 nA at 70° C.; 10 nA at 45° C.; and 14.6 nA at 90° C.

Example 2

Fuel Cell with Nanometric Materials

Fuel cell embodiments of the present invention can be prepared using techniques, methods and materials known in the art, using a thin film of nanometric materials as prepared in Example 1.

All publications and description mentioned above are herein incorporated by reference. None is admitted as prior art.

As will be understood by those skilled in the art, the present invention may be embodied in other specific forms without departing from the essential characteristics thereof. Those skilled in the art will recognize, or be able to ascertain using no more than routine experimentation, many equivalents to the specific embodiments of the invention described herein. Such equivalents are intended to be encompassed by the following claims.

What is claimed is:

1. A 1-3 mm thick dense nanometric ceramic material;
   having a relative density of 90-98% and a grain size of 10-20 nm;
   wherein the dense nanometric ceramic material is selected from the group consisting of zirconia, ceria, yttrium aluminum garnets, and alumina.

2. The material of claim 1, wherein the dense nanometric ceramic material is selected from the group consisting of yttria stabilized zirconia and samarium-doped ceria.

3. The material of claim 1, wherein the dense nanometric ceramic material has a relative density of 95 percent.

4. The material of claim 1, wherein the dense nanometric material has a relative density of 98 percent.

5. The material claim 1, wherein the dense nanometric material has a grain size of 10 nm.

* * * * *